United States Patent
Liang et al.

(10) Patent No.: US 11,180,676 B2
(45) Date of Patent: Nov. 23, 2021

(54) GLASS CLEANING AGENT, SELF-CLEANING GLASS, AND PREPARATION METHOD THEREOF

(71) Applicants: CSG HOLDING CO., LTD., Shenzhen (CN); SHENZHEN CSG APPLIED TECHNOLOGY CO., LTD., Shenzhen (CN)

(72) Inventors: Haichao Liang, Shenzhen (CN); Qi Wang, Shenzhen (CN)

(73) Assignees: CSG HOLDING CO., LTD., Shenzhen (CN); SHENZHEN CSG APPLIED TECHNOLOGY CO., LTD., Shenzhen (CN)

( * ) Notice: Subject to any disclaimer, the term of this patent is extended or adjusted under 35 U.S.C. 154(b) by 44 days.

(21) Appl. No.: 16/510,969

(22) Filed: Jul. 14, 2019

(65) Prior Publication Data

US 2020/0024478 A1    Jan. 23, 2020

(30) Foreign Application Priority Data

Jul. 17, 2018 (CN) .......................... 201810783321.1

(51) Int. Cl.
| | |
|---|---|
| *C09D 183/08* | (2006.01) |
| *C03C 17/30* | (2006.01) |
| *C08G 77/08* | (2006.01) |
| *C08G 77/26* | (2006.01) |
| *C09D 5/00* | (2006.01) |
| *C03C 23/00* | (2006.01) |

(52) U.S. Cl.
CPC ............ *C09D 183/08* (2013.01); *C03C 17/30* (2013.01); *C03C 23/0075* (2013.01); *C08G 77/08* (2013.01); *C08G 77/26* (2013.01); *C09D 5/00* (2013.01); *C03C 2217/76* (2013.01); *C03C 2218/11* (2013.01); *C03C 2218/32* (2013.01)

(58) Field of Classification Search
USPC .................. 106/287.1–287.16; 428/447–452
See application file for complete search history.

(56) References Cited

U.S. PATENT DOCUMENTS

| 6,171,770 B1* | 1/2001 | Chen ...................... G03C 11/08 |
| | | 430/131 |
| 6,472,012 B2* | 10/2002 | Nakada .................... C03C 17/30 |
| | | 106/287.1 |
| 6,730,240 B2* | 5/2004 | Arimoto .............. C09D 183/08 |
| | | 252/182.12 |
| 6,887,836 B2* | 5/2005 | Majeti .................... C11D 3/373 |
| | | 510/109 |
| 2003/0069350 A1* | 4/2003 | Yoshihara ............ C09D 183/14 |
| | | 524/588 |
| 2005/0142354 A1* | 6/2005 | Chen .................. G03G 15/2057 |
| | | 428/328 |
| 2007/0155897 A1* | 7/2007 | Tani ........................ C08G 77/50 |
| | | 524/837 |
| 2014/0120320 A1* | 5/2014 | Kanai .................. C09D 183/14 |
| | | 428/172 |
| 2015/0140322 A1* | 5/2015 | Lin ........................ C08F 292/00 |
| | | 428/334 |
| 2017/0002223 A1 | 1/2017 | Yu et al. |
| 2018/0022937 A1* | 1/2018 | Ijeri ....................... B05D 3/067 |
| | | 106/14.25 |

FOREIGN PATENT DOCUMENTS

CN            107987722 A      5/2018

\* cited by examiner

*Primary Examiner* — Marc S Zimmer
(74) *Attorney, Agent, or Firm* — Kilpatrick Townsend & Stockton, LLP (57) ABSTRACT

The present disclosure relates to a glass cleaning agent, a self-cleaning glass, and preparation methods thereof. The cleaning agent for a glass includes, by weight percentage, 40% to 65% of silicone monomer, 10% to 20% of a first silane coupling agent, 5% to 15% of a second silane coupling agent, 0.1% to 2% of organic tin catalyst, and 5% to 20% of crosslinking agent. The first silane coupling agent is at least one selected from the group consisting of γ-aminopropyltriethoxysilane and N-(β-aminoethyl)-γ-aminopropyltrimethoxysilane. The second silane coupling agent is γ-glycidoxypropyltrimethoxysilane.

18 Claims, 3 Drawing Sheets

GLASS CLEANING AGENT, SELF-CLEANING GLASS, AND PREPARATION METHOD THEREOF

CROSS REFERENCE TO RELATED APPLICATIONS

This application claims priority under 35 U.S.C. § 119 to Chinese Patent Application No. 2018107833211, filed on Jul. 17, 2018, the entire content of which is incorporated herein in its entirety.

TECHNICAL FIELD

The present disclosure relates to the technical field of glass cleaning, and particularly relates to a glass cleaning agent, a self-cleaning glass, and preparation methods thereof.

BACKGROUND

The problem of cleaning the curtain wall glass has been plaguing people, which has also affected the city appearance at the same time. There is no good solution so far. In order to solve the problem of cleaning the curtain wall glass, people start to coat the surface of the glass. The self-cleaning glass is one type of the coated glass. The self-cleaning glass is also commercially known as easy-clean glass. It generally refers to the application of a special coating on the surface of the glass, such that dust or dirty liquid (including water, even oily liquid) are difficult to adhere to the surface of the glass, or can be easily washed away by rain under natural force. This makes the surface of the glass very easy to keep clean, effectively extending the time to keep clean and reducing the hassle and expense of cleaning the surface of the glass.

Currently, there are two main types of realization of the self-cleaning glass: (1) super-hydrophilic self-cleaning glass having a light-induced nano-$TiO_2$ film. Currently, most of the self-cleaning glass on the market is light-induced. In other words, a $TiO_2$ film is coated on the surface of the glass. The light-induced hydrophilicity mechanism of the $TiO_2$ film is: a surface of the $TiO_2$ film is excited by UV light to excite electron-hole pairs. The electron-hole pair does not react with $O_2$ and $H_2O$ of air as in the photocatalytic reaction, but reacts with $TiO_2$ crystal itself on the surface thereof. The electron reacts with $Ti^{4+}$ to form $Ti^{3+}$, and the hole reacts with $O^{2-}$ to form $O_2$ and oxygen hole. On the one hand, $Ti^{3+}$ is extremely unstable and is rapidly oxidized by $O_2$ in the air; and on the other hand, the oxygen hole combines with $H_2O$ in the air to form a chemically adsorbed aqueous layer (surface hydroxyl group), which is the source of hydrophilicity on the surface of the $TiO_2$ film. After stopping the ultraviolet light irradiation for several hours, the chemisorbed hydroxyl layer was substituted by oxygen in the air, and the surface of the $TiO_2$ film is returned to a hydrophobic state. Theoretically, the surface of the $TiO_2$ film can be maintained in a super-hydrophilic state by intermittent UV irradiation. Excellent super-hydrophilic properties make the $TiO_2$ film widely used in anti-fog mirrors and self-cleaning glasses.

(2) A hydrophobic self-cleaning glass with a lotus effect. Due to the fear of dust and oil contamination of $TiO_2$ film and the poor timeliness of super-hydrophobic self-cleaning glass, people began to turn to the research of hydrophobic self-cleaning glass with the lotus effect. The so-called hydrophobic self-cleaning glass means that the surface of the glass has a high hydrophobicity and a similar lotus effect, such that water cannot be completely adhered by glass, and the surface tension of the water droplet itself produces a drop-shaped phenomenon. The water droplets will naturally fall off and take away the dust, such that the glass has an easy-cleaning effect, and the dust is difficult to accumulate. Compared with the water staining of the ordinary glass, the long-term easy-cleaning effect of the self-cleaning glass shows a significant difference.

The super-hydrophilic self-cleaning glass having the light-induced nano-$TiO_2$ film and the hydrophobic self-cleaning glass with the lotus effect are the two main ways to achieve self-cleaning of glass. However, these two types of self-cleaning glass have many shortcomings in practical applications. Since the $TiO_2$ coating does not have the ability to prevent static electricity on the surface of the glass, and is also highly dependent on sunlight, $TiO_2$ self-cleaning glass has a remarkable self-cleaning effect at the beginning of use, however, it has been found that the self-cleaning durability of the $TiO_2$ film is deteriorated after the long-term use. This is mainly due to the common coverage of dust and a small amount of organic matter in the air, such that some/most of the $TiO_2$ film cannot be irradiated by ultraviolet light, thereby losing the light-induced self-cleaning function. In other words, $TiO_2$ film cannot fundamentally prevent the glass from becoming dirty, which leads to the $TiO_2$ film self-cleaning glass cannot meet the requirements of long-term outdoor use.

SUMMARY

According to various embodiments of the present disclosure, a glass cleaning agent, a self-cleaning glass, and preparation methods thereof are provided.

A cleaning agent for a glass includes, by weight percentage, 40% to 65% of silicone monomer, 10% to 20% of a first silane coupling agent, 5% to 15% of a second silane coupling agent, 0.1% to 2% of organic tin catalyst, and 5% to 20% of crosslinking agent. The first silane coupling agent is at least one selected from the group consisting of γ-aminopropyltriethoxysilane and N-(β-aminoethyl)-γ-aminopropyltrimethoxysilane. The second silane coupling agent is γ-glycidoxypropyltrimethoxysilane.

A method of preparing the aforementioned cleaning agent for the glass includes: mixing 40% to 65% by weight of silicone monomer and 0.1% to 2% by weight of organic tin catalyst to obtain a mixture, and heating the mixture to a temperature of 55° C. to 80° C.; and adding 10% to 20% by weight of a first silane coupling agent, 5% to 15% by weight of a second silane coupling agent, and 5% to 20% by weight of crosslinking agent to react for 2 h to 6 h at the temperature of 55° C. to 80° C. The first silane coupling agent is at least one selected from the group consisting of γ-aminopropyltriethoxysilane and N-(β-aminoethyl)-γ-aminopropyltrimethoxysilane. The second silane coupling agent is γ-glycidoxypropyltrimethoxysilane.

A method of preparing a self-cleaning glass includes: coating the aforementioned cleaning agent on a surface of a glass; and heating and curing the cleaning agent to form a hydrophobic layer on the surface of the glass, thus obtaining the self-cleaning glass.

The above and other features of the disclosure including various novel details of construction and combinations of parts, and other advantages, will now be more particularly described with reference to the accompanying drawings and pointed out in the claims.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the disclosure. Of the drawing.

DETAILED DESCRIPTION OF THE EMBODIMENTS

The above objects, features and advantages of the present disclosure will become more apparent by describing in detail embodiments thereof with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A cleaning agent for a glass according to one embodiment includes, by weight percentage, 40% to 65% of silicone monomer;
10% to 20% of a first silane coupling agent;
5% to 15% of a second silane coupling agent;
0.1% to 2% of organic tin catalyst; and
5% to 20% of crosslinking agent.

Optionally, the cleaning agent further includes 5% to 15% of a third silane coupling agent.

In one embodiment, the silicone monomer is at least one selected from the group consisting of methyltriethoxysilane, ethyltriethoxysilane, propyltriethoxysilane, isopropyltriethoxysilane, methylpropyldiethoxysilane, and isobutyltriethoxysilane.

In one embodiment, the first silane coupling agent is at least one selected from the group consisting of γ-aminopropyltriethoxysilane (KH550) and N-(β-aminoethyl)-γ-aminopropyltrimethoxysilane (KH792).

In one embodiment, the second silane coupling agent is γ-glycidoxypropyltrimethoxysilane (KH560).

In one embodiment, the third silane coupling agent is γ-methacryloxypropyltrimethoxyl silane (KH570).

In one embodiment, the organic tin catalyst is at least one selected from the group consisting of dibutyltin diacetate, dibutyltin dilaurate, stannous octoate, and di-N-butylbis(dodecylthio)tin.

In one embodiment, the crosslinking agent is at least one selected from the group consisting of hexamethyldisiloxane, dimethyldichlorosilane, methyl orthosilicate, and ethyl orthosilicate.

In one embodiment, a cleaning agent for a glass according to one embodiment includes, by weight percentage, 45% to 60% of silicone monomer;
12% to 15% of a first silane coupling agent;
10% to 15% of a second silane coupling agent;
8% to 10% of a third silane coupling agent;
1% to 2% of organic tin catalyst; and
8% to 10% of crosslinking agent.

The aforementioned cleaning agent adopts the silicone monomer, the first silane coupling agent, and the second silane coupling agent as main components with a certain proportion. Under the action of the organic tin catalyst and high temperature, the cleaning agent can react with an active hydroxyl functional group on a surface of a glass to form chemical covalent bonds, such that a formed hydrophobic coating can have a strong adhesion to the surface of the glass, a better ultraviolet irradiation resistance, and a heat resistance stability. In addition, the silicone materials have a low surface energy, better hydrophobicity, and self-cleaning effect, which not only enables the glass to have excellent weather resistance, meeting the long-term outdoor use requirements, but also gives the glass a remarkable hydrophobic and easy-cleaning effect.

Moreover, the aforementioned cleaning agent can be used to prepare a self-cleaning glass, which can realize self-cleaning effect without depending on the light-induced action of ultraviolet light. Further, the aforementioned cleaning agent can form a colorless transparent coating on the surface of the glass after curing, which does not affect the appearance of the glass and exhibits excellent light transmittance. The process of preparing the self-cleaning glass using the aforementioned cleaning agent is simple, and the hydrophobic effect is long lasting.

Figure 1:
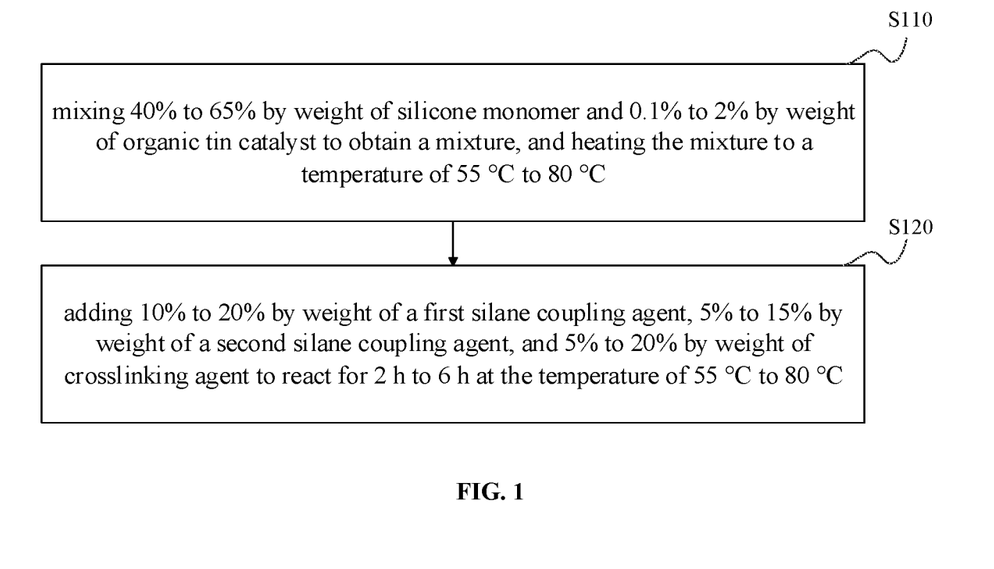
FIG. 1 is a flowchart of a method of preparing a cleaning agent for a glass according to an embodiment.

Referring to FIG. 1, a method of preparing the aforementioned cleaning agent for the glass includes:

In step S110, the silicone monomer and the organic tin catalyst are mixed to obtain a mixture, and then the mixture is heated a temperature of 55° C. to 80° C.

In one embodiment, 40% to 65% by weight of silicone monomer and 0.1% to 2% by weight of organic tin catalyst are separately added into a reaction kettle, gradually heated to a temperature of 55° C. to 80° C. under stirring. In addition, a time for gradually heated up under stirring is 30 min to 60 min. In alternative embodiments, the silicone monomer and the organic tin catalyst are simultaneously added into a reaction kettle and stirred.

In step S120, the remaining components are continuously added to react for 2 h to 6 h at the temperature of 55° C. to 80° C.

In one embodiment, 10% to 20% by weight of a first silane coupling agent, 5% to 15% by weight of a second silane coupling agent, 5% to 15% by weight of a third silane coupling agent, and 5% to 20% by weight of crosslinking agent are continuously added into the reaction kettle to react for 2 h to 6 h at the temperature of 55° C. to 80° C., and then the cleaning agent is obtained after cooling.

The aforementioned method of preparing the cleaning agent is simple, and the obtained cleaning agent can form a uniform hydrophobic coating.

Figure 2:
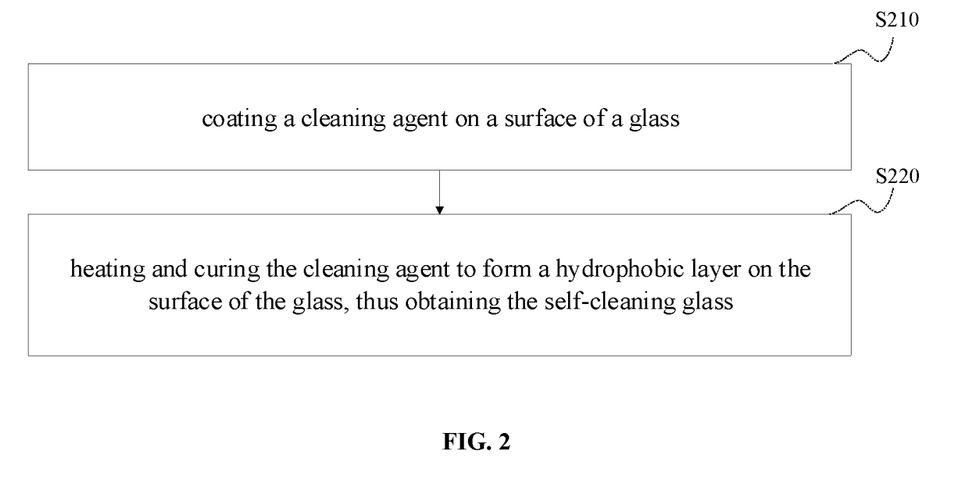
FIG. 2 is a flowchart of a method of preparing a self-cleaning glass according to an embodiment.

Referring to FIG. 2, a method of preparing a self-cleaning glass according to an embodiment includes:

In step S210, the aforementioned cleaning agent is coated on a surface of a glass.

In one embodiment, the glass is soda-lime glass or high alumina glass.

In one embodiment, the glass is tempered glass or semi-tempered glass.

In one embodiment, the glass is a glass plate. In addition, the glass plate has a thickness of about 3 mm to about 10 mm.

In one embodiment, the coating method is spray coating or roller coating. Of course, in alternative embodiments, other commonly used methods such as scrape coating can also be used as long as a coating can be formed on the surface of the glass.

In step S220, the cleaning agent is heated and cured to form a hydrophobic layer on the surface of the glass, such that the self-cleaning glass is obtained.

In one embodiment, the cleaning agent is heated at a temperature ranging from 250° C. to 280° C. for 25 minutes to 35 minutes. It should be understood that, the heating temperature and heating time are not limited hereto, as long as the cleaning agent can be reacted.

In one embodiment, the cleaning agent is cured to form a hydrophobic layer having a thickness of about 0.15 µm to about 100 µm. In addition, the thickness of the hydrophobic layer can also be about 25 µm to about 75 µm. In addition, when coating the cleaning agent, it is necessary to maintain the temperature of the spraying environment ranging from 20° C. to 25° C., such that spraying problems such as orange peel, wave pattern, spots, and the like cannot occur, and the final product cannot have the problem of rainbow spots.

In this step, under high temperature catalysis, the cleaning agent can react with the active hydroxyl functional group on the surface of the glass to form chemical covalent bonds, such that the organosilicon polymer firmly adheres to the surface of the glass. In addition, the cooperative use of the first coupling agent and the second coupling agent further promotes adhesion of the organosilicon polymer on the surface of the glass, such that the prepared self-cleaning glass has a long service life and good weather resistance.

The aforementioned method of preparing the self-cleaning glass has a simple process, and the hydrophobic layer of the prepared self-cleaning glass has a strong adhesion to the glass substrate, and has a good thermal stability and weather resistance.

A self-cleaning glass according to an embodiment is obtained by the aforementioned method.

Figure 3:
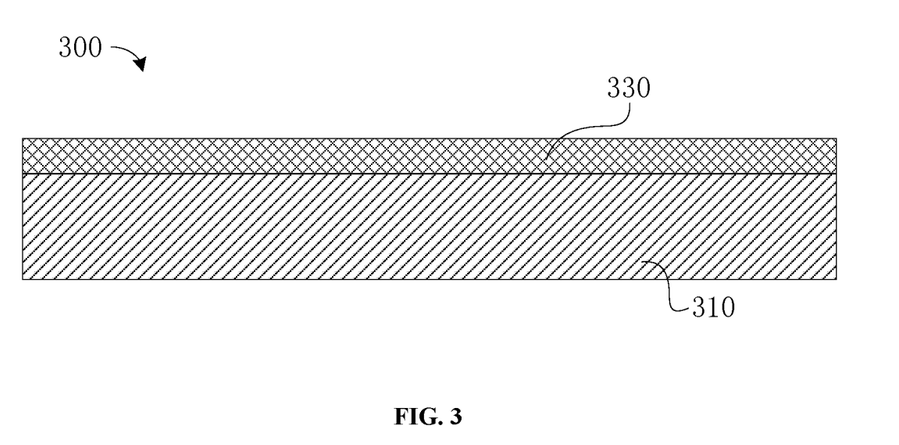
FIG. 3 is a schematic cross-sectional view of a self-cleaning glass according to an embodiment.

Referring to FIG. 3, a self-cleaning glass 300 according to an embodiment includes a glass substrate 310 and a hydrophobic layer 330.

In one embodiment, the glass substrate 310 is made of soda-lime glass or high alumina glass.

In one embodiment, the glass substrate 310 is made of tempered glass or semi-tempered glass.

In one embodiment, the glass substrate 310 is a glass plate. In one embodiment, the glass substrate 310 has a thickness of about 3 mm to about 10 mm. Of course, it should be noted that, the glass substrate 310 is not limited to a plate shape, and it may be other shapes such as curved shape, as long as the hydrophobic layer 330 can be formed on a surface of the glass substrate 310.

In the illustrated embodiment, the hydrophobic layer 330 is formed on one surface of the glass substrate 310. Of course, it should be noted that, in alternative embodiments, the hydrophobic layer 330 can be formed on both surfaces of the glass substrate 310.

The hydrophobic layer 330 is formed from the aforementioned cleaning agent. In one embodiment, the hydrophobic layer 330 has a thickness of about 0.15 µm to about 100 µm.

The hydrophobic coating of the aforementioned self-cleaning glass can react with the active hydroxyl functional group on the surface of the glass to form chemical covalent bonds, thereby achieving strong adhesion to the surface of the glass. In addition, the aforementioned self-cleaning glass has a better ultraviolet irradiation resistance and heat resistance stability, better hydrophobicity and self-cleaning effect, meeting the long-term outdoor use requirements.

The aforementioned self-cleaning glass can be applied to building curtain wall glasses, solar photovoltaic glasses, shower room glasses, sunlight room glasses, residential doors and windows, and automobile rearview mirrors.

The following is a description of specific examples, and the following examples, unless otherwise specified, do not contain other components not specifically indicated except for unavoidable impurities.

Example 1

A cleaning agent included, by weight percentage,
60% of isobutyltriethoxysilane;
12% of KH550;
10% of KH560;
8% of KH570;
2% of dibutyltin diacetate; and
8% of ethyl orthosilicate.

The cleaning agent was prepared according to the aforementioned proportion of each component. Specifically, the preparation steps were as follows: isobutyltriethoxysilane and dibutyltin diacetate were weighed according to their corresponding proportions, added into a reaction kettle in three divided times, and gradually heated to a temperature of 55° C. under stirring. After stirring for 0.5 h, the remaining components were added into the reaction kettle and the reaction temperature was maintained at 55° C. for 6 h. The cleaning agent was obtained after cooling.

The prepared cleaning agent was uniformly coated on a surface of a clean and dry glass substrate by a spraying equipment. The used glass substrate was a fully tempered soda-lime glass having a thickness of 3 mm. The uniformity of a sprayed hydrophobic self-cleaning coating had the following requirements: appearance spraying problems such as orange peel, wave pattern, spots, and the like could not occur, and the appearance of the final product could not have the problem of rainbow spots. The control requirements of the thickness of the coating was as follows: the uniform film had a thickness of about 5 µm.

The obtained glass was quickly placed in a high temperature environment for heating and curing. The glass was heated at a temperature of 280° C. for 35 mins. After the heating was completed, the self-cleaning glass was obtained after cooling.

Example 2

A cleaning agent included, by weight percentage,
60% of methyltriethoxysilane;
12% of KH550;
10% of KH560;
8% of KH570;
2% of stannous octoate; and
8% of ethyl orthosilicate.

The cleaning agent was prepared according to the aforementioned proportion of each component. Specifically, the preparation steps were as follows: methyltriethoxysilane and stannous octoate were weighed according to their corresponding proportions, added into a reaction kettle in three divided times, and gradually heated to a temperature of 80° C. under stirring. After stirring for 0.5 h, the remaining components were added into the reaction kettle and the reaction temperature was maintained at 80° C. for 2 h. The cleaning agent was obtained after cooling.

The prepared cleaning agent was uniformly coated on a surface of a clean and dry glass substrate by a spraying equipment. The used glass substrate was a fully tempered soda-lime glass having a thickness of 6 mm. The uniformity of a sprayed hydrophobic self-cleaning coating had the following requirements: appearance spraying problems such as orange peel, wave pattern, spots, and the like could not occur, and the appearance of the final product could not have the problem of rainbow spots. The control requirements of the thickness of the coating was as follows: the uniform film had a thickness of about 7 µm.

The obtained glass was quickly placed in a high temperature environment for heating and curing. The glass was heated at a temperature of 280° C. for 25 mins. After the heating was completed, the self-cleaning glass was obtained after cooling.

Example 3

A cleaning agent included, by weight percentage,
60% of isobutyltriethoxysilane;
12% of KH550;
10% of KH560;
8% of KH570;
2% of stannous octoate; and
8% of hexamethyldisiloxane.

The cleaning agent was prepared according to the aforementioned proportion of each component. Specifically, the preparation steps were as follows: isobutyltriethoxysilane and stannous octoate were weighed according to their corresponding proportions, added into a reaction kettle in three divided times, and gradually heated to a temperature of 65° C. under stirring. After stirring for 0.5 h, the remaining components were added into the reaction kettle and the reaction temperature was maintained at 65° C. for 5 h. The cleaning agent was obtained after cooling.

The prepared cleaning agent was uniformly coated on a surface of a clean and dry glass substrate by a spraying equipment. The used glass substrate was a fully tempered high-aluminum glass having a thickness of 6 mm. The uniformity of a sprayed hydrophobic self-cleaning coating had the following requirements: appearance spraying problems such as orange peel, wave pattern, spots, and the like could not occur, and the appearance of the final product could not have the problem of rainbow spots. The control requirements of the thickness of the coating was as follows: the uniform film had a thickness of about 4 µm.

The obtained glass was quickly placed in a high temperature environment for heating and curing. The glass was heated at a temperature of 280° C. for 30 mins. After the heating was completed, the self-cleaning glass was obtained after cooling.

Example 4

A cleaning agent included, by weight percentage,
60% of isobutyltriethoxysilane;
15% of KH550;
14% of KH570;
1% of stannous octoate; and
10% of ethyl orthosilicate.

The cleaning agent was prepared according to the aforementioned proportion of each component. Specifically, the preparation steps were as follows: methyltriethoxysilane and stannous octoate were weighed according to their corresponding proportions, added into a reaction kettle in three divided times, and gradually heated to a temperature of 75° C. under stirring. After stirring for 0.5 h, the remaining components were added into the reaction kettle and the reaction temperature was maintained at 75° C. for 3 h. The cleaning agent was obtained after cooling.

The prepared cleaning agent was uniformly coated on a surface of a clean and dry glass substrate by a spraying equipment. The used glass substrate was a semi-tempered high-aluminum glass having a thickness of 3 mm. The uniformity of a sprayed hydrophobic self-cleaning coating had the following requirements: appearance spraying problems such as orange peel, wave pattern, spots, and the like could not occur, and the appearance of the final product could not have the problem of rainbow spots. The control requirements of the thickness of the coating was as follows: the uniform film had a thickness of about 5 µm.

The obtained glass was quickly placed in a high temperature environment for heating and curing. The glass was heated at a temperature of 280° C. for 32 mins. After the heating was completed, the self-cleaning glass was obtained after cooling.

Example 5

A cleaning agent included, by weight percentage,
55% of isobutyltriethoxysilane;
15% of KH792;
11% of KH560;
10% of KH570;
1% of dibutyltin dilaurate; and
8% of ethyl orthosilicate.

The cleaning agent was prepared according to the aforementioned proportion of each component. Specifically, the preparation steps were as follows: isobutyltriethoxysilane and dibutyltin dilaurate were weighed according to their corresponding proportions, added into a reaction kettle in three divided times, and gradually heated to a temperature of 70° C. under stirring. After stirring for 0.5 h, the remaining components were added into the reaction kettle and the reaction temperature was maintained at 70° C. for 4 h. The cleaning agent was obtained after cooling.

The prepared cleaning agent was uniformly coated on a surface of a clean and dry glass substrate by a spraying equipment. The used glass substrate was a semi-tempered soda-lime glass having a thickness of 5 mm. The uniformity of a sprayed hydrophobic self-cleaning coating had the following requirements: appearance spraying problems such as orange peel, wave pattern, spots, and the like could not occur, and the appearance of the final product could not have the problem of rainbow spots. The control requirements of the thickness of the coating was as follows: the uniform film had a thickness of about 6 µm.

The obtained glass was quickly placed in a high temperature environment for heating and curing. The glass was heated at a temperature of 280° C. for 30 mins. After the heating was completed, the self-cleaning glass was obtained after cooling.

Example 6

A cleaning agent included, by weight percentage,
60% of methyltriethoxysilane;
15% of KH550;
5% of isopropyltrichlorosilane;
10% of KH570;
2% of stannous octoate; and
8% of ethyl orthosilicate.

The cleaning agent was prepared according to the aforementioned proportion of each component. Specifically, the preparation steps were as follows: methyltriethoxysilane and stannous octoate were weighed according to their corresponding proportions, added into a reaction kettle in three divided times, and gradually heated to a temperature of 80° C. under stirring. After stirring for 0.5 h, the remaining components were added into the reaction kettle and the reaction temperature was maintained at 80° C. for 2 h. The cleaning agent was obtained after cooling.

The prepared cleaning agent was uniformly coated on a surface of a clean and dry glass substrate by a spraying equipment. The used glass substrate was a fully tempered soda-lime glass having a thickness of 6 mm. The uniformity of a sprayed hydrophobic self-cleaning coating had the following requirements: appearance spraying problems such as orange peel, wave pattern, spots, and the like could not occur, and the appearance of the final product could not have the problem of rainbow spots. The control requirements of the thickness of the coating was as follows: the uniform film had a thickness of about 5 μm.

The obtained glass was quickly placed in a high temperature environment for heating and curing. The glass was heated at a temperature of 280° C. for 25 mins. After the heating was completed, the self-cleaning glass was obtained after cooling.

The self-cleaning glass samples prepared in examples 1 to 6 were subjected to performance tests. The water droplet contact angle and visible light transmittance of the self-cleaning glass samples were mainly tested. The water droplet contact angle was measured by the SDC-200 contact angle measuring instrument, and the visible light transmittance was measured by a spectrophotometer conforming to GB/T 2680. The results were shown in Table 1.

TABLE 1

|  | Water droplet contact angle (°) | Visible light transmittance (%) |
| --- | --- | --- |
| Example 1 | 104 | 89.01 |
| Example 2 | 105 | 89.09 |
| Example 3 | 106 | 89.17 |
| Example 4 | 105 | 89.02 |
| Example 5 | 106 | 89.10 |
| Example 6 | 98 | 89.13 |

The main reason resulting in the above performance differences is the difference in hydrophobic groups on the branch chain of silicone and the difference in the degree of polymerization of the prepolymer.

The self-cleaning glasses prepared in Examples 1 to 6 were subjected to weather resistance tests. The results were shown in Table 2. The weather resistance tests included the following seven tests:

(1) wear resistance test: the wear resistance was measured according to the method specified in EN 1096-2:2012. In other words, a hydrophobic self-cleaning glass piece manufactured by the same process as the product was used as a sample. The samples were fixed on a test platform, and the wear resistance test was performed according to the specified method using the equipment that satisfied the requirements of EN 1096-2:2012. When the test was completed, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(2) acid resistance test: the acid resistance was measured according to the method specified in JC/T 2170-2013. In other words, a hydrophobic self-cleaning glass piece manufactured by the same process as the product was used as a sample. The samples were immersed in a 1 mol/L hydrochloric acid solution at a temperature of (23±2) ° C. for 24 hours. When the immersion was completed, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(3) heat resistance test: the heat resistance was measured according to the method specified in GB 15763.3-2009. In other words, a hydrophobic self-cleaning glass piece manufactured by the same process as the product was used as a sample. The samples were immersed in boiling deionized water and boiled for 2 hour. After boiling, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(4) salt spray resistance test: the salt spray resistance was measured according to the method specified in JC/T 2170-2013. In other words, a hydrophobic self-cleaning glass piece manufactured by the same process as the product was used as a sample. The samples were immersed in a sodium chloride solution having a mass concentration of (50±5) g/L for 96 hours. When the immersion was completed, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(5) damp heat resistance test: the damp heat resistance was measured according to the method specified in JC/T 2170-2013. In other words, a hydrophobic self-cleaning glass piece manufactured by the same process as the product was used as a sample. Then, the samples were vertically placed in a constant temperature and humidity chamber. The relative humidity in the constant temperature and humidity chamber was equal to or more than 85%, the temperature was controlled at 58° C., and the test time was 1000 hours. After the test was completed, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(6) humidity freeze resistance test: the humidity freeze resistance was measured according to the method specified in JC/T 2170-2013. In other words, a hydrophobic self-cleaning glass piece manufactured by the same process as the product was used as a sample. A temperature sensor was put on the front or rear surface of the middle portion of samples, and then the samples were loaded in a climate chamber under room temperature. The temperature sensor was connected to a temperature monitor, and then the climate chamber was closed. The sample was subjected to a humidity freeze test at temperatures of 85° C. and −40° C.

having a humidity of 85% for 10 cycles. After the test was completed, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(7) UV resistance test: the UV resistance was measured according to the method specified in JC/T 2170-2013. In other words, a hydrophobic self-cleaning glass piece manufactured by the same process as the product was used as a sample. The ultraviolet irradiation time was 720 h and the cumulative total radiation energy was equal to or more than 15 kWh/m$^2$. After the irradiation was completed, the samples were rinsed thoroughly with deionized water and absolute ethanol, and were placed in an oven at a temperature of (110±10) ° C. for 15 mins to 20 mins. The measurements of the water droplet contact angle and the visible light transmittance were performed after the samples was cooled to room temperature.

(3) The basic assumption of this conversion is that the properties of the product exhibited under high stress conditions are consistent with those exhibited at normal temperature.

TABLE 3

|  | Service life (year) |
|---|---|
| Example 1 | 10 |
| Example 2 | 8 |
| Example 3 | 8 |
| Example 4 | 3 |
| Example 5 | 8 |
| Example 6 | 5 |

The main reason resulting in the difference in service life is that the degree of chemical reaction between the functional groups of the prepolymer and the active hydroxyl groups on the surface of the glass is different, resulting in different binding forces.

TABLE 2

| | | | Wear resistance test | acid resistance test | heat resistance test | salt spray resistance test | damp heat resistance test | humidity freeze resistance test | UV resistance test |
|---|---|---|---|---|---|---|---|---|---|
| Example 1 | Water droplet contact angle (°) | before test | 104 | 105 | 105 | 104 | 104 | 105 | 105 |
| | | after test | 98 | 99 | 101 | 98 | 98 | 102 | 99 |
| | Visible light transmittance (%) | before test | 89.01 | 89.06 | 89.02 | 89.02 | 89.03 | 89.01 | 89.05 |
| | | after test | 88.36 | 88.61 | 88.89 | 88.71 | 88.12 | 88.52 | 88.47 |
| Example 2 | Water droplet contact angle (°) | before test | 105 | 105 | 105 | 104 | 105 | 104 | 105 |
| | | after test | 99 | 98 | 100 | 97 | 97 | 100 | 98 |
| | Visible light transmittance (%) | before test | 89.09 | 89.08 | 89.10 | 89.09 | 89.11 | 89.12 | 89.10 |
| | | after test | 88.12 | 88.51 | 88.82 | 88.64 | 88.19 | 88.61 | 88.43 |
| Example 3 | Water droplet contact angle (°) | before test | 106 | 106 | 106 | 105 | 106 | 105 | 105 |
| | | after test | 101 | 100 | 102 | 99 | 100 | 101 | 100 |
| | Visible light transmittance (%) | before test | 89.17 | 89.16 | 89.19 | 89.16 | 89.15 | 89.16 | 89.18 |
| | | after test | 88.26 | 88.57 | 88.82 | 88.75 | 88.17 | 88.53 | 88.45 |
| Example 4 | Water droplet contact angle (°) | before test | 93 | 94 | 94 | 95 | 93 | 94 | 93 |
| | | after test | 86 | 85 | 85 | 88 | 90 | 87 | 91 |
| | Visible light transmittance (%) | before test | 89.01 | 89.03 | 89.05 | 89.01 | 89.05 | 89.04 | 89.03 |
| | | after test | 88.39 | 88.46 | 88.89 | 88.71 | 88.25 | 88.59 | 88.47 |
| Example 5 | Water droplet contact angle (°) | before test | 106 | 106 | 105 | 106 | 105 | 106 | 106 |
| | | after test | 101 | 100 | 102 | 100 | 100 | 102 | 101 |
| | Visible light transmittance (%) | before test | 89.09 | 89.10 | 89.11 | 89.12 | 89.10 | 89.08 | 89.11 |
| | | after test | 88.35 | 88.59 | 88.90 | 88.78 | 88.09 | 88.54 | 88.61 |
| Example 6 | Water droplet contact angle (°) | before test | 98 | 100 | 97 | 99 | 95 | 100 | 99 |
| | | after test | 92 | 94 | 92 | 94 | 89 | 95 | 91 |
| | Visible light transmittance (%) | before test | 89.13 | 89.20 | 89.07 | 89.15 | 89.18 | 89.23 | 89.19 |
| | | after test | 88.78 | 89.18 | 89.01 | 88.72 | 88.91 | 88.49 | 89.14 |

The service life of the self-cleaning glasses prepared in examples 1 to 6 were tested. The results were shown in Table 3. The service life was estimated by the high accelerated aging experiment and the following formula:

$$AF=\exp\{(Ea/k)\times[(1/Tu)-(1/Ts)]+(RHs''-RHu'')\}$$

where, (1) The value of the activation energy Ea is 0.80 eV, which is the recommended value in GR-1221; k is the Boltzmann constant, and the value of k is $8.6\times10^{-5}$; Tu is the normal temperature, and the value of Tu is 85 (absolute temperature); Ts is the temperature at the acceleration state, and the value of Ts is 110 (absolute temperature); RHu'' is the nth power of the normal relative humidity (n is generally 2), and the value of RHu'' is 0.85; RHs'' is the nth power of the relative humidity at the acceleration state (n is generally 2), and the value of RHs'' is 0.85.

(2) The premise of this conversion is that the product has the same failure mechanism in both aging modes.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

The invention claimed is:

1. A cleaning agent for a glass, comprising: by weight percentage,
   40% to 65% of silicone precursor;
   10% to 20% of a first silane coupling agent;
   5% to 15% of a second silane coupling agent;
   0.1% to 2% of organic tin catalyst; and
   5% to 20% of crosslinking agent;
   wherein the first silane coupling agent is at least one selected from the group consisting of γ-aminopropyltriethoxysilane and N-(β-aminoethyl)-γ-aminopropyltrimethoxysilane;
   wherein the second silane coupling agent is γ-glycidoxypropyltrimethoxysilane.

2. The cleaning agent according to claim 1, further comprising: by weight percentage, 5% to 15% of a third silane coupling agent, the third silane coupling agent being γ-methacryloxypropyltrimethoxyl silane.

3. The cleaning agent according to claim 1, wherein the silicon precursor is at least one selected from the group consisting of methyltriethoxysilane, ethyltriethoxysilane, propyltriethoxysilane, isopropyltriethoxysilane, methylpropyldiethoxysilane, and isobutyltriethoxysilane.

4. The cleaning agent according to claim 1, wherein the organic tin catalyst is at least one selected from the group consisting of dibutyltin diacetate, dibutyltin dilaurate, stannous octoate, and di-N-butylbis(dodecylthio)tin.

5. The cleaning agent according to claim 1, wherein the crosslinking agent is at least one selected from the group consisting of dimethyldichlorosilane, methyl orthosilicate, and ethyl orthosilicate.

6. A method of preparing a cleaning agent for a glass, comprising:
   mixing 40% to 65% by weight of silicone precursor and 0.1% to 2% by weight of organic tin catalyst to obtain a mixture, and heating the mixture to a temperature of 55° C. to 80° C.; and
   adding 10% to 20% by weight of a first silane coupling agent, 5% to 15% by weight of a second silane coupling agent, and 5% to 20% by weight of crosslinking agent to react for 2 h to 6 h at the temperature of 55° C. to 80° C.;
   wherein the first silane coupling agent is at least one selected from the group consisting of γ-aminopropyltriethoxysilane and N-(β-aminoethyl)-γ-aminopropyltrimethoxysilane;
   wherein the second silane coupling agent is γ-glycidoxypropyltrimethoxysilane.

7. The method according to claim 6, further comprising: adding 5% to 15% by weight of a third silane coupling agent, the third silane coupling agent being γ-methacryloxypropyltrimethoxyl silane.

8. The method according to claim 6, wherein the silicone precursor is at least one selected from the group consisting of methyltriethoxysilane, ethyltriethoxysilane, propyltriethoxysilane, isopropyltriethoxysilane, methylpropyldiethoxysilane, and isobutyltriethoxysilane.

9. The method according to claim 6, wherein the organic tin catalyst is at least one selected from the group consisting of dibutyltin diacetate, dibutyltin dilaurate, stannous octoate, and di-N-butylbis(dodecylthio)tin.

10. The method according to claim 6, wherein the crosslinking agent is at least one selected from the group consisting of dimethyldichlorosilane, methyl orthosilicate, and ethyl orthosilicate.

11. A method of preparing a self-cleaning glass, comprising:
    coating a cleaning agent of claim 1 on a surface of a glass; and
    heating and curing the cleaning agent to form a hydrophobic layer on the surface of the glass, thus obtaining the self-cleaning glass.

12. The method according to claim 11, wherein the cleaning agent is coated by spray coating, roller coating, or scrape coating.

13. The method according to claim 11, wherein the glass is soda-lime glass or high alumina glass.

14. The method according to claim 11, wherein the glass is tempered glass or semi-tempered glass.

15. The method according to claim 11, wherein the glass has a thickness of about 3 mm to about 10 mm.

16. The method according to claim 11, wherein the hydrophobic layer has a thickness of about 0.15 μm to about 100 μm.

17. The method according to claim 11, wherein the hydrophobic layer has a thickness of about 25 μm to about 75 μm.

18. The method according to claim 11, wherein the cleaning agent is heated at a temperature ranging from 300° C. to 320° C. for 25 mins to 35 mins.

* * * * *